Nov. 28, 1961  L. PÉRAS  3,010,411
SUSPENSION SYSTEMS OF TIRE-MOUNTED BOGIE TRUCKS
WITH LATERAL GUIDE MEANS
Filed Jan. 29, 1959

INVENTOR
LUCIEN PÉRAS

BY
ATTORNEYS

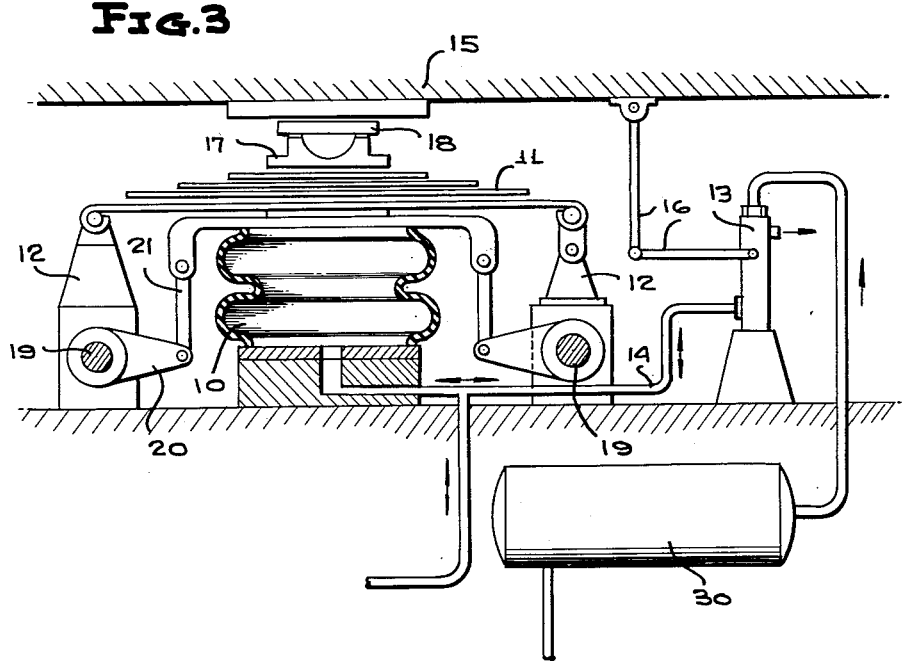
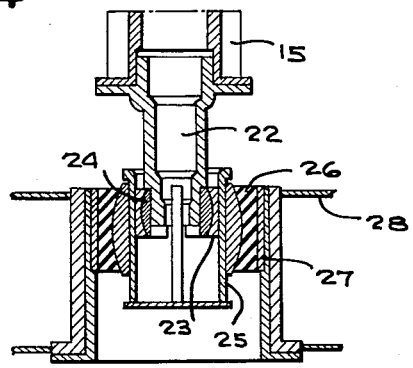

United States Patent Office 3,010,411
Patented Nov. 28, 1961

3,010,411
SUSPENSION SYSTEMS OF TIRE-MOUNTED BOGIE TRUCKS WITH LATERAL GUIDE MEANS
Lucien Péras, Billancourt, France, assignor to Regie Nationale des Usines Renault, Billancourt, France
Filed Jan. 29, 1959, Ser. No. 789,953
Claims priority, application France Feb. 13, 1958
6 Claims. (Cl. 105—215)

This invention is concerned with a suspension system for bogie-trucks which is suitable for tire-mounted railway cars, this type of bogie truck comprising as already known the following elements:

Tire-mounted vertical wheels supporting the vehicle load and rolling on two special tracks provided on either side of the rails;

Conventional-type steel wheels with flanged metal tire for ordinary rails, these wheels being paired with the tire-mounted ones and adapted to substitute themselves for the rubber tires in case of puncture or deflation, to act as guide means in track gears, and as brake drums;

Lateral guide means also consisting of horizontal, tire-mounted wheels engaging special guide rails having a vertical engagement surface.

The suspension system for the bogie-truck according to this invention is characterized notably in that it comprises a primary suspension means adapted to associate with the first suspension stage consisting of the tires, a resilient-block connection between the truck frame and the axles, in combination with a secondary suspension means interposed between the truck frame and the body of the vehicle. Such secondary suspension means comprises essentially a pair of lateral assemblies consisting of pneumatic cushions and resilient members acting in parallel, these assemblies being interconnected through at least one transverse torsion bar having a stabilizing function.

On the other hand, the body-to-truck connection takes place by means of a resilient block assisting in the reduction of shocks between the truck and the body.

In order to afford a clearer understanding of this invention and of the manner in which the same may be carried out in the practice, reference will now be made to the accompanying drawings forming part of this specification and illustrating diagrammatically by way of example a typical form of embodiment of the invention.

In the drawings:

FIGURE 3 is a diagrammatic longitudinal view showing one of the lateral assemblies of the secondary suspension system, and FIGURE 4 is a vertical fragmentary view showing the mounting of the truck pintle.

Figure 1:
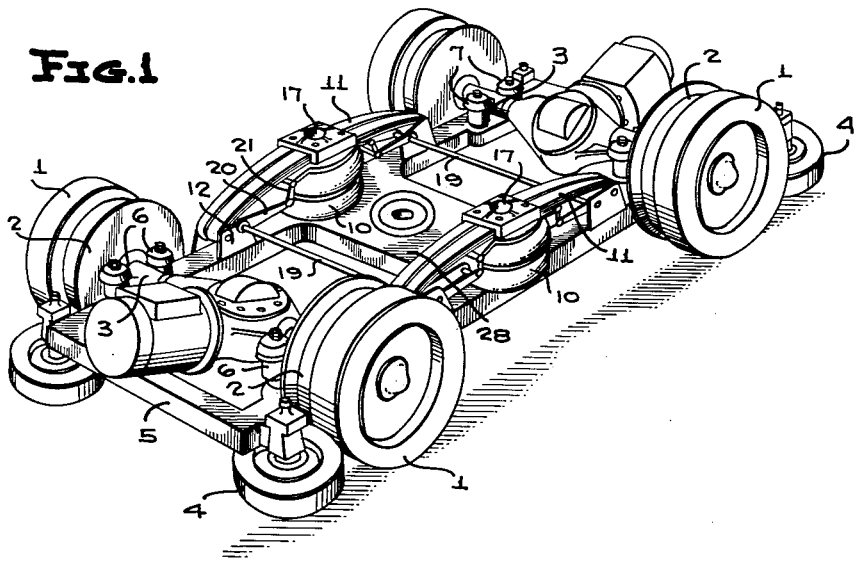
FIGURE 1 is a complete perspective view of the bogie-truck.
Figure 2:
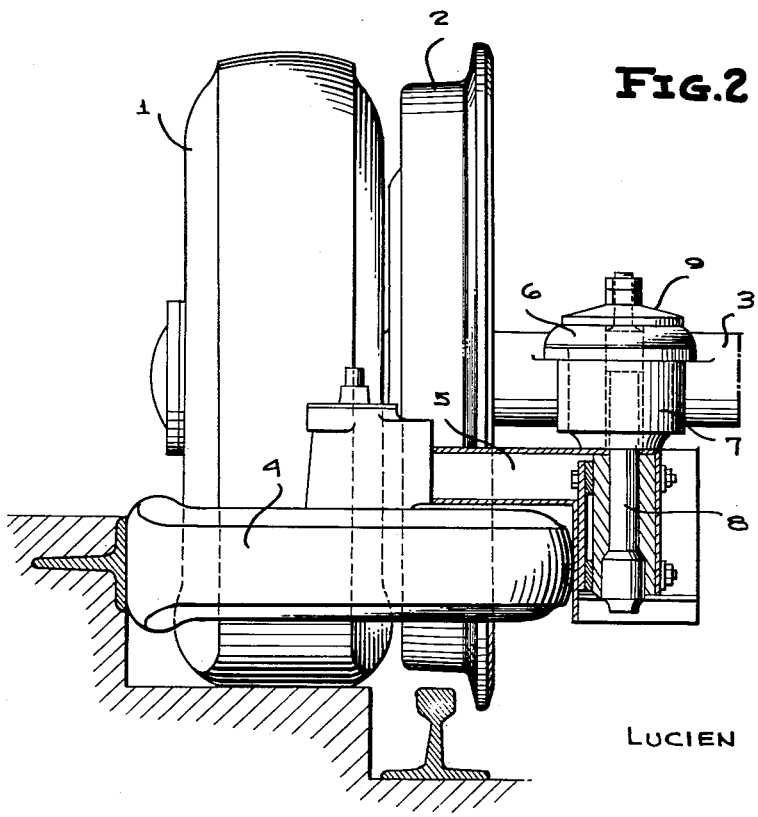
FIGURE 2 is a diagrammatic elevational view showing on a larger scale the primary suspension system.

Referring to the complete view of FIG. 1 and also to FIG. 2 of the drawings, it is apparent that the tire-mounted carrier wheels 1 associated or paired with the steel wheels 2 are mounted on axles 3 whereas the lateral guide wheels 4 are secured directly on the frame 5 of the bogie-truck.

The connection between the frame 5 of the bogie-truck and the axles 3, which is called a primary suspension means comprises rubber blocks 6. There are four rubber blocks 6 per axle, and these blocks are adapted to transmit the stress between frame and axles. The flexibility of the suspension members must be calculated as a function of the engine torque reaction, notably in the case considered herein of a power truck.

It is clearly shown (FIG. 2) that the bogie frame 5 is suspended from lugs 7 projecting from the axles, these lugs acting at the same time as bearing members to the resilient blocks 6, connecting rods 8 secured to the frame extending through these blocks and being each provided at their upper end with a cap member 9 adapted to bear directly on the block 6.

Of course, the resilient action of the rolling tires 1 is also effective in the operation of this primary suspension system.

The connection between the bogie-truck and the body, called a secondary suspension means, comprises two lateral balancing assemblies disposed on either side of the bogie pintle 22. In FIGS. 1 and 3, it is clearly visible that each assembly comprises an air cushion or spring 10 mounted under and disposed parallel with a set of leaf springs 11, which yield to the same degree during the suspension movements.

The pneumatic or air springs 10 are supplied with compressed air at a pressure varying as a function of the vehicle load from a compressed air reservoir 30 through a distributor 13 and a single pipe line 14 leading to each spring (FIG. 3). This distributor 13 is responsive to the position of the vehicle body 15 due to a link connection 16 whereby the body is maintained at a substantially constant level in relation to the rail. The springs 11 and the air cushion 10 sustain the body 15 on the bogie truck and they are in this fashion subjected together to deformations of identical vigorous amplitude which come from movements of the body 15 of the vehicle. The pressure of the air springs or cushions 10 is modified according to the load. The distributor 13 and its operating linkage connection 16 constitute what may be called a detector-corrector assembly. The distributor 13 is actuated by the connection 16 so as to admit air into the cushion or permit the escape of air from the cushion depending upon whether there is an increase or decrease of the load.

If desired, the elastic characteristics of the air spring 10 may be varied or adjusted notably by branching off the line 14 an extra reservoir (not shown in FIG. 3) of which the capacity is added more or less to that of the air spring 10.

Alternately, a separate distributor may be provided for each air spring 10. In this case, there will be one supply line 14 per air spring, with or without extra reservoir or branch line.

The flexibility of the leaf springs 11 is determined as a function of the desired suspension characteristics, and these springs have their ends pivoted on supports 12 rigid with the truck frame 5. These springs carry through the medium of a vertical-thrust bearing 17 the friction shoes 18 constituting the lateral bearing members of the body.

In addition, two anti-roll stabilizing torsion-bars 19 are journalled in bearings provided on the spring-anchoring supports 12 and are connected through substantially horizontal levers 20 to vertical links 21 pivoted on each corresponding lateral balancing assembly. The torsion bars 19 equalize the load between the lateral spring assemblies and, therefore, stabilize the vehicle transversely.

On the other hand, the swivelling mounting of the vehicle body on the bogie (see FIG. 4) comprises a pintle 22 rigid with the body and carrying a ring 23 mounted on a part-spherical member 24, said ring 23 being slidably engaged in a bushing 25 closed at its lower end in order to provide an oil sump; this bushing 25 is secured, for example by curing, cementing or otherwise, to a block 26 of resilient material, carried by a support 27 secured in the central cross member 28 of the bogie frame.

When the bogie-truck is running under normal conditions, the wheels 1 support the entire weight of the vehicle on their special tracks and the bogie assembly is guided in curved track sections by the horizontal wheels 4.

It will be seen that this guiding action is transmitted to the wheels 1 with a certain resiliency due to the flexibility of the tires on wheels 4 and also to the provision of the suspension blocks 6. Any jolts likely to be transmitted to the body as a consequence of this guiding action are damped out by the tires 4, resilient blocks 6 and resilient blocks 26 of pintle 22, and thus distributed amongst the lateral balancing assemblies through the torsion bars 19.

Of course, various modifications may be brought to the form of embodiment shown and described herein by way of example, without, however, departing from the spirit and scope of the invention as set forth in the appended claims.

I claim:

1. For a vehicle having a body, a tire mounted bogie truck intended to travel along a track having lateral upwardly extending guide surfaces, said bogie truck comprising a frame for supporting said body, a centrally disposed slidable pintle connection for connecting the body and the frame, lateral guide means carried by the frame and having tires mounted thereon in horizontal positions for engaging said lateral guide surfaces, a suspension means for the body carried by the frame and including frictional supports for the body, axles having ground engaging tires, resilient blocks supporting the frame relative to the axles, vertical co-axial members connected to the frame and to the axles, respectively, and between which the resilient blocks are disposed with the co-axial members connected to the frame resting upon said resilient blocks.

2. The combination of claim 1, wherein said co-axial members include lugs projecting laterally from the axles and having vertical openings therein, said co-axial members carried by the frame including rods attached to and upstanding from the frame, said rods extending through the openings in the lugs, said resilient blocks being mounted on the lugs and cap members carried by the rods and resting on the resilient blocks.

3. The combination of claim 1, wherein a resilient means is interposed between the slidable pintle connection and the frame for assisting in damping out jolts likely to be transmitted to the body as a consequence of the guiding action of the lateral guide means.

4. The combination of claim 1 wherein said suspension means is disposed on opposite sides of the pintle connection and includes an air cushion mounted on the frame and a set of leaf springs disposed on top of the air cushion and carrying the frictional supports.

5. The combination of claim 4, wherein said suspension means on opposite sides of the pintle connection are interconnected by at least one transverse torsion bar having a stabilizing function.

6. The combination of claim 4, wherein said air cushions are supplied with compressed air from a supply source, a valve means controlling the supply of compressed air to the air cushions and means connected to the body for actuating the valve means responsive to the vertical position of the body.

References Cited in the file of this patent

UNITED STATES PATENTS

| | | |
|---|---|---|
| 2,101,024 | Heinze | Dec. 7, 1937 |
| 2,317,377 | Hallquist | Apr. 29, 1943 |
| 2,594,734 | Cripe | Apr. 29, 1952 |